US012742072B2

(12) United States Patent
Knoote et al.

(10) Patent No.: US 12,742,072 B2
(45) Date of Patent: Sep. 22, 2026

(54) ORGANIC SOLVENT-BASED RETROREFLECTIVE COMPOSITION FOR INDUSTRIAL SPRAYING

(71) Applicant: Ink Invent IP B.V., Nieuwegein (NL)

(72) Inventors: Jacques Arthur Knoote, Zoetermeer (NL); Paul Willem Mijnen, Utrecht (NL); Harald Paul Kerres, Zoetermeer (NL); Philippus Jacob Muis, Andel (NL); Menno Arthur Knoote, The Hague (NL); Ivana Subotic-Galjer, Alphen a/d Rijn (NL); Ramon Maria Henricus Schlijper, Delft (NL)

(73) Assignee: INK INVENT IP B.V., Nieuwegein (NL)

( * ) Notice: Subject to any disclaimer, the term of this patent is extended or adjusted under 35 U.S.C. 154(b) by 168 days.

(21) Appl. No.: 18/561,910

(22) PCT Filed: May 16, 2022

(86) PCT No.: PCT/EP2022/063157

§ 371 (c)(1),
(2) Date: Nov. 17, 2023

(87) PCT Pub. No.: WO2022/243230

PCT Pub. Date: Nov. 24, 2022

(65) Prior Publication Data

US 2024/0247150 A1 Jul. 25, 2024

(30) Foreign Application Priority Data

May 18, 2021 (EP) .................................... 21174391

(51) Int. Cl.
*C09D 5/33* (2006.01)
*C09D 5/02* (2006.01)
(Continued)

(52) U.S. Cl.
CPC ............ *C09D 5/004* (2013.01); *C09D 5/021* (2013.01); *C09D 7/20* (2018.01); *C09D 7/44* (2018.01);
(Continued)

(58) Field of Classification Search
None
See application file for complete search history.

(56) References Cited

U.S. PATENT DOCUMENTS

| | | | |
|---|---|---|---|
| 3,228,897 | A | 1/1966 | Nellssen |
| 4,082,427 | A | 4/1978 | Nakashima |
| 2004/0157960 | A1 | 8/2004 | Rowe |

FOREIGN PATENT DOCUMENTS

| | | | |
|---|---|---|---|
| CN | 102597028 | A | 7/2012 |
| CN | 109423133 | A | 3/2019 |

(Continued)

OTHER PUBLICATIONS

English translation of Murai (JP 2017/101194) (Year: 2017).*
(Continued)

*Primary Examiner* — Ronak C Patel
(74) *Attorney, Agent, or Firm* — DINSMORE & SHOHL LLP

(57) ABSTRACT

The invention relates to an organic solvent-based retroreflective ink, paint or coating composition, having a first Brookfield viscosity $\eta_1$ at a shear rate of 0.5 rpm of between 0.2 and 8 Pas and a second Brookfield viscosity $\eta_2$ at a shear rate of 20 rpm that is between 80 and 450 mPa·s, with the proviso that $\eta_2$ is at least 2 times lower than $\eta_1$, wherein the organic solvent-based retroreflective ink, paint or coating composition consists of, based on the total weight of the composition: • 25-75 wt. % of organic solvent: • 1-85 wt. % of spherical glass beads: • 0.15 1.2 wt. % of thickener; and • 0-30 wt. % of one or more further ingredients: wherein the
(Continued)

Brookfield viscosities $\eta_1$ and $\eta_2$ are measured with a #2 spindle in a 600 ml beaker having a diameter of 8.25 cm at a temperature of 25° C.

17 Claims, 2 Drawing Sheets

(51) Int. Cl.

*C09D 7/20* (2018.01)
*C09D 7/40* (2018.01)
*C09D 7/44* (2018.01)
*C09D 7/62* (2018.01)
*C09D 7/65* (2018.01)

(52) U.S. Cl.

CPC ................ *C09D 7/62* (2018.01); *C09D 7/65* (2018.01); *C09D 7/69* (2018.01); *C09D 7/70* (2018.01)

(56) References Cited

FOREIGN PATENT DOCUMENTS

| | | | |
|---|---|---|---|
| JP | S5317643 | A | 2/1978 |
| JP | H0770471 | A | 3/1995 |
| JP | 2002296410 | A | 10/2002 |
| WO | 2004017104 | A2 | 2/2004 |
| WO | 2014109564 | A1 | 7/2014 |
| WO | 0042113 | A1 | 7/2020 |

OTHER PUBLICATIONS

English translation of Kaigami et al. (JP 2019-178197). (Year: 2019).*

International Search Report and Written Opinion pertaining to Application No. PCT/EP2022/063157 dated Sep. 14, 2022, 10 pages.

* cited by examiner

ORGANIC SOLVENT-BASED RETROREFLECTIVE COMPOSITION FOR INDUSTRIAL SPRAYING

CROSS REFERENCES TO RELATED APPLICATIONS

This application is a national-stage application under 35 U.S.C. § 371 of International Application No. PCT/EP2022/063157, filed May 16, 2022, which International Application claims benefit of priority to European Patent Application No. 21174391.9, filed May 18, 2021.

FIELD OF THE INVENTION

The invention relates to an organic solvent-based retroreflective composition and to methods for its preparation. The invention further relates to a process for coating a substrate with a retroreflective layer using said organic solvent-based retroreflective composition and to substrates coated with a retroreflective layer obtainable by said process.

BACKGROUND OF THE INVENTION

Retroreflective paints, inks and coatings are used in a variety of applications. For example to improve the visibility of road signs, road markers, textiles, cars, et cetera, under dark conditions. Paints, inks and coatings are typically provided with retroreflective properties by adding spherical glass beads having a specific refractive index. Retroreflection occurs by the tandem action of refraction of the incident light through the upper surface of a spherical glass bead, internal reflection from the lower onside surface of the spherical glass bead and subsequent refraction of the light as it exits the upper surface of the spherical glass bead, travelling back to the direction from which the impinging light came.

WO2004/017104A2 discloses retroreflective compositions comprising retroreflective microspheres, a binder system and a thixotropic blend comprising at least two thixotropic agents in an amount of from about 2 to about 5 wt. %, based on the retroreflective composition. The retroreflective compositions are intended to be used as paints, inks and coatings and are applied to a substrate using aerosols applicators with a propellant. Table 1 of WO2004/017104A2 discloses typical and preferred amounts of the classes of ingredients in the compositions.

Example 1 of WO2004/017104A2 discloses a composition wherein the solvent is an undefined aliphatic or aromatic naphtha, the solid resin granules are of an undefined acrylic type, the first thixotrope is of an undefined polyurea type, and the second thixotrope is of an undefined calcium sulphonate complex. The accompanying viscosity of the composition of Example 1, measured with a Brookfield #3 spindle at 25° C. would be between 9000 and 30000 cps at 0.5 rpm and between 600 and 1900 cps at 20 rpm.

WO00/42113A1 concerns retroreflective inks comprising microbeads in a liquid carrier medium. The inks are intended for screen printing on textile. WO00/42113A1 discloses that the viscosity of a screen printing ink is 10 to 30 Pa·s at room temperature as measured with a Brookfield viscometer using a #5 spindle rotating at 10 rpm. The inks disclosed in Tables 1~4 and 6 comprise water, a thickening agent, and glass beads. The viscosities are between 12.3 and 32 Pa·s at room temperature as measured with a Brookfield viscometer using a #5 spindle rotating at 10 rpm. Screen printing is a printing technique wherein a mesh is used to transfer paste-like ink onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed. As is generally known to the skilled person in the field of printing, the rheological characteristics of screen printing inks and inks for professional or industrial (high-speed) spraying are fundamentally different because of the distinct techniques used to apply them to a substrate. Screen printing inks are not suitable for professional or industrial (high-speed) spraying.

Developing retroreflective compositions having good stability, sprayability and resulting in good print or coating quality is a challenge because the rheology modifiers needed to keep the retroreflective particles— such as spherical glass beads typically having a density that is substantially higher than that of the fluid carrier— homogeneously distributed across the fluid carrier generally adversely affect the rheological behaviour during spraying.

There is a need for retroreflective inks, coatings and paints that are sufficiently stable, that can be easily applied to a variety of substrates, preferably using professional or industrial (high-speed) spraying, and that result in retroreflective layers or coatings with improved quality.

Accordingly, it is an object of the invention to provide retroreflective compositions that can be professionally or industrially applied, as a paint, ink or coating, to a variety of substrates, wherein said retroreflective compositions can be applied to the substrate by spraying, such as professional or industrial (high-speed) spraying, and wherein said retroreflective compositions have a sufficient stability or shelf-life.

It is a further object of the invention to provide retroreflective compositions that can be professionally or industrially applied, as a paint, ink or coating, to a variety of substrates by spraying, such as professional or industrial (high-speed) spraying, resulting in improved print or coating quality, such as good or improved homogeneity or smoothness of the layer.

SUMMARY OF THE INVENTION

The inventors have unexpectedly established that one or more of the objectives can be met by using an organic solvent-based retroreflective composition that exhibits shear-thinning behaviour with a lower viscosity at increased shear rates and a reduced concentration of thickener as compared to prior art compositions.

Accordingly, in a first aspect, the invention provides an organic solvent-based retroreflective ink, paint or coating composition, having a first Brookfield viscosity $\eta_1$ at a shear rate of 0.5 rpm of between 0.2 and 8 Pa·s and a second Brookfield viscosity $\eta_2$ at a shear rate of 20 rpm that is between 80 and 450 mPa·s, with the proviso that $\eta_2$ is at least 2 times lower than $\eta_1$, wherein the organic solvent-based retroreflective ink, paint or coating composition consists of, based on the total weight of the composition:

- 25-75 wt. % of organic solvent;
- 1-85 wt. % of spherical glass beads having a median particle diameter D50, as measured with laser diffraction, between 1 and 150 μm, and a refractive index, measured at a wavelength λ of 589 nm, between 1.5 and 2.8;
- 0.15-1.2 wt. % of thickener; and
- 0-30 wt. % of one or more further ingredients;

wherein the Brookfield viscosities $\eta_1$ and $\eta_2$ are measured with a #2 spindle in a 600 ml beaker having a diameter of 8.25 cm at a temperature of 25° C.

The inventors have established that this organic solvent-based retroreflective composition can be applied, e.g. using professional or industrial (high-speed) spraying, to various substrates resulting in retroreflective coating layers with excellent print or coating quality.

With the reduced amount of thickener and the reduced viscosity at a shear rate of 20 rpm, improved homogeneity and smoothness of the retroreflective layer are obtained, more particularly layers with less 'orange peel' are obtained. The reduced amount of thickener not only reduces the viscosity at increased shear rates (representative for spraying conditions), but also at low shear rates (relevant for stability). The inventors have unexpectedly found that the reduced amount of thickener required to obtain improved homogeneity and smoothness of the retroreflective layer is still adequate to provide the organic solvent-based retroreflective ink, paint or coating composition with sufficient stability or shelf-life.

In a second aspect, a process is provided for the preparation of the organic solvent-based retroreflective ink, paint or coating composition as defined herein, said process comprising the steps of:

(i) adding the organic solvent, the spherical glass beads as defined hereinbefore, the thickener as defined hereinbefore and the optional one or more further ingredients as defined hereinbefore, to a container; and (ii) stirring or homogenizing the mixture obtained in step (i), preferably at a temperature between 15 and 70° C., preferably for a period of between 5 and 60 minutes.

In a third aspect, the invention provides a process for coating a substrate with a retroreflective layer, said process comprising the steps of:

a) providing a substrate;

b) optionally applying a primer layer to the substrate of step (a);

c) optionally, but not preferably, applying a coloured base layer to the substrate of step (a) or to the primer layer of step (b);

d) spraying the organic solvent-based retroreflective ink, paint or coating composition as defined hereinbefore onto the substrate of step (a) or onto the layer of step (b) or (c);

e) drying and/or curing the substrate coated with the retroreflective layer obtained in step (d); and f) optionally coating the dried substrate coated with the retroreflective layer obtained in step (e) with one or more further transparent coating layers followed by drying and/or curing.

In a fourth aspect, the invention concerns substrates coated with a retroreflective layer obtained by or obtainable by the process for coating a substrate as defined herein.

Definitions

The term 'orange peel' as used herein refers to a mottle-like printing defect characterized by a granular image reminiscent of the texture of an orange peel, caused by a failure of the ink to flow out to a smooth film layer.

The term 'shear-thinning behaviour' in the context of the organic solvent-based composition of the present invention relates to a reduction of the viscosity when the composition, initially being in a static situation, is subjected to a shear rate.

DETAILED DESCRIPTION

Figure 1A:
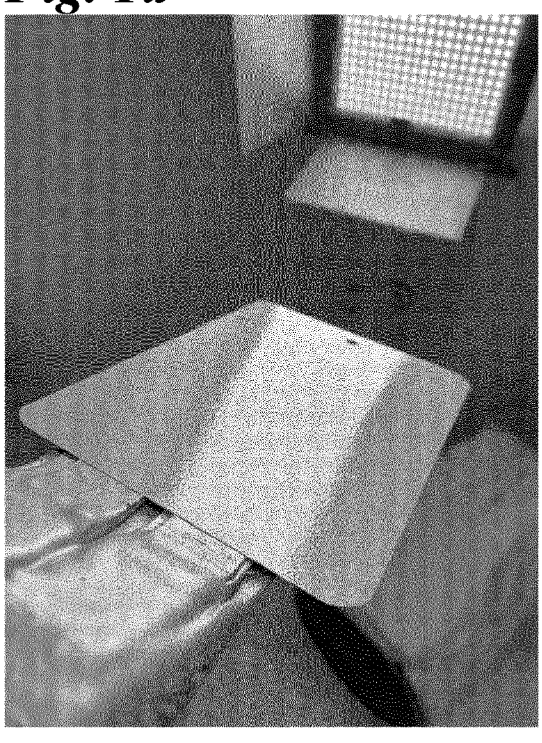
FIGS. 1*a* to 1*h* depict smoothness/orange peel of retroreflective coatings prepared using compositions according to the invention and comparative compositions.
Figure 1B:
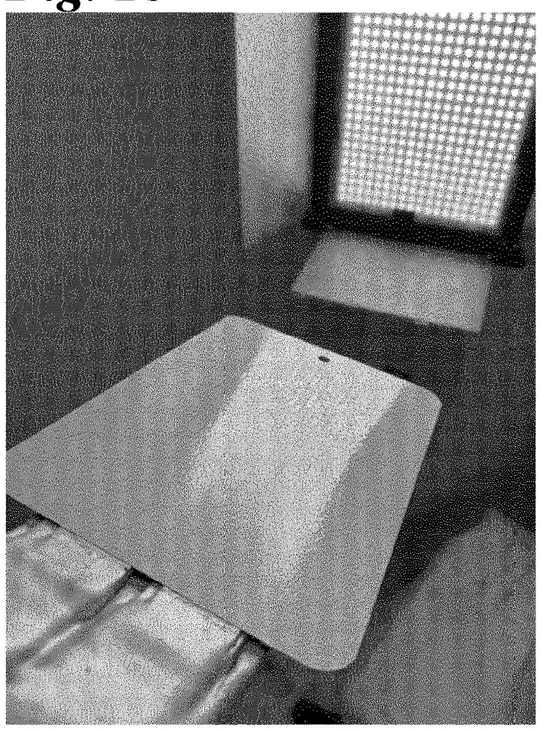
Figure 1C:
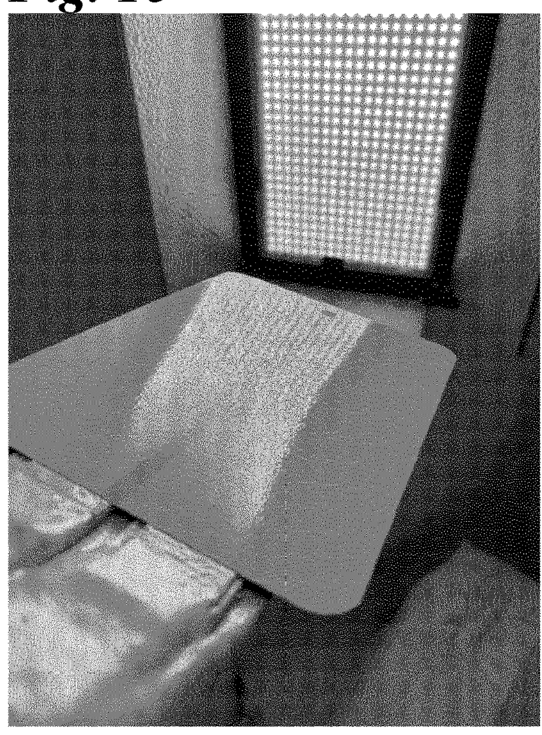
Figure 1D:
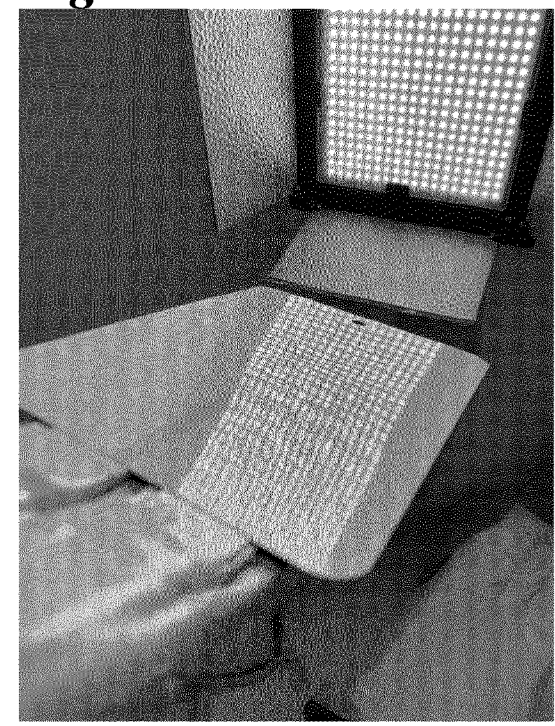
Figure 1E:
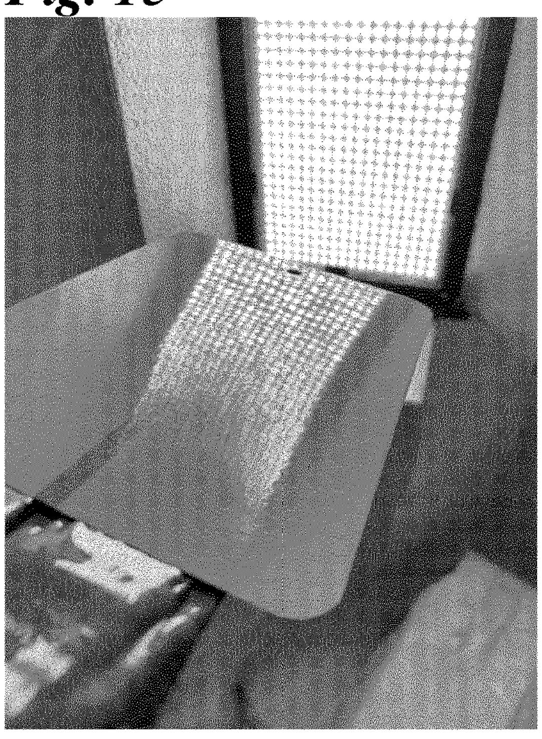
Figure 1F:
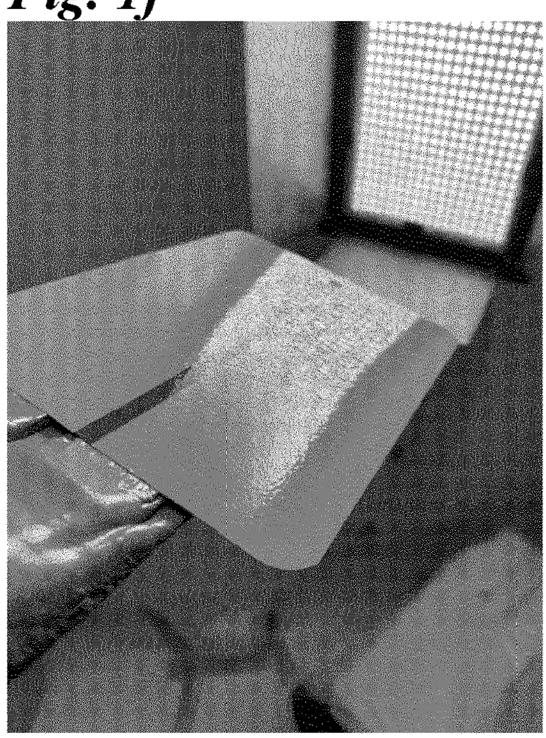

In a first aspect, the invention concerns an organic solvent-based retroreflective ink, paint or coating composition, having a first Brookfield viscosity $\eta_1$ at a shear rate of 0.5 rpm of between 0.2 and 8 Pa·s and a second Brookfield viscosity $\eta_2$ at a shear rate of 20 rpm that is between 80 and 450 mPa·s, with the proviso that $\eta_2$ is at least 2 times lower than $\eta_1$, wherein the organic solvent-based retroreflective ink, paint or coating composition consists of, based on the total weight of the composition:

25-75 wt. % of organic solvent;

1-85 wt. % of spherical glass beads having a median particle diameter D50, as measured with laser diffraction, between 1 and 150 μm, and a refractive index, measured at a wavelength 2 of 589 nm, between 1.5 and 2.8;

0.15-1.2 wt. % of thickener; and 0-30 wt. % of one or more further ingredients;

wherein the Brookfield viscosities $\eta_1$ and $\eta_2$ are measured with a #2 spindle in a 600 ml beaker having a diameter of 8.25 cm at a temperature of 25° C.

In a very preferred embodiment, the first aspect concerns an organic solvent-based retroreflective ink, paint or coating composition, having a first Brookfield viscosity $\eta_1$ at a shear rate of 0.5 rpm of between 0.2 and 8 Pa·s and a second Brookfield viscosity $\eta_2$ at a shear rate of 20 rpm that is between 80 and 450 mPa·s, with the proviso that $\eta_2$ is at least 2 times lower than $\eta_1$, wherein the organic solvent-based retroreflective ink, paint or coating composition consists of, based on the total weight of the composition:

25-68 wt. % of organic solvent;

20-70 wt. % of spherical glass beads having a median particle diameter D50, as measured with laser diffraction, between 5 and 150 μm, and a refractive index, measured at a wavelength 2 of 589 nm, between 1.5 and 2.8;

0.15-1.2 wt. % of thickener; and 0-30 wt. % of one or more further ingredients;

wherein the Brookfield viscosities $\eta_1$ and $\eta_2$ are measured with a #2 spindle in a 600 ml beaker having a diameter of 8.25 cm at a temperature of 25° C.

Stability

In preferred embodiments, the organic solvent-based retroreflective ink, paint or coating composition is stable for at least 12 hours, more preferably for at least 1 day, even more preferably at least 2 days, at least 5 days, at least 10 days, at least 1 month, at least 2 months, at least 6 months, at least 1 year, at least 2 years, wherein the composition is considered stable if upon visual and tactile inspection no sedimentation and no separation can be observed. In preferred embodiments, the organic solvent-based retroreflective ink, paint or coating composition is spray-stable for at least 24 hours. A composition is considered spray-stable if it can be sprayed without remixing.

Organic Solvent

The term 'organic solvent' as used herein concerns an organic solvent or a mixture of organic solvents that comprises less than 3 wt. % of water, preferably less than 2 wt.

% of water, more preferably less than 1 wt. % of water, even more preferably less than 0.5 wt. % of water, most preferably no water.

Preferred organic solvents are chosen from the group consisting of aliphatic and aromatic solvents, ketones, esters, glycoethers, alcohols, halogenated hydrocarbons, and combinations thereof. Very preferred organic solvent are chosen from the group consisting of xylene (mixture of isomers), toluene, ethylbenzene, naphtha, 1,2,4-trimethylbenzene, mesitylene, n-propylbenzene, isopentyl acetate, n-butyl acetate, (2-methoxymethylethoxy)propanol, 2-butoxyethyl acetate, 2-methylbutyl acetate, isobutanol, 1-butanol, 1-ethoxypropane-2-ol, 2,6-dimethyl-4-heptanone, 2-methoxy-1-methylethylacetate, 4,6-dimethyl-heptane-2-one, 4-methyl-2-pentanone, 1-methoxy-2-propanol, 1-methoxy-2-propylacetate, 2-(2-butoxyethoxy)ethanol, 2-butoxyethanol, 5-methylhexane-2-one, ethyl acetate and combinations thereof.

In a very preferred embodiment, the amount of the organic solvent is 25-68 wt. %, based on the total weight of the organic solvent-based retroreflective ink, coating or paint composition.

In a preferred embodiment, the amount of the organic solvent is 27-65 wt. %, more preferably 30-60 wt. %, even more preferably 35-58 wt. %, based on the total weight of the organic solvent-based retroreflective ink, coating or paint composition.

In embodiments, the amount of the organic solvent is 25-66 wt. %, 25-62 wt. %, 25-60 wt. %, 25-58 wt. % or 25-56 wt. %, based on the total weight of the organic solvent-based retroreflective ink, coating or paint composition.

In other embodiments, the amount of the organic solvent is 28-68 wt. %, 30-68 wt. %, 32-68 wt. %, 34-68 wt. %, 36-68 wt. %, 38-68 wt. % or 40-68 wt. %, based on the total weight of the organic solvent-based retroreflective ink, coating or paint composition.

In still other embodiments, the amount of the organic solvent is 28-75 wt. %, 30-75 wt. %, 32-75 wt. %, 34-75 wt. %, 36-75 wt. %, 38-75 wt. % or 40-75 wt. %, based on the total weight of the organic solvent-based retroreflective ink, coating or paint composition.

Spherical Glass Beads

As defined hereinbefore, the refractive index of the spherical glass beads, measured at a wavelength $\lambda$ of 589 nm, is between 1.5 and 2.8.

In a preferred embodiment, the spherical glass beads have a refractive index, measured at a wavelength $\lambda$ of 589 nm, of between:

(a) 2.0 and 2.8, preferably between 2.1 and 2.4; or (b) 1.7 and 2.1, preferably between 1.8 and 2.0.

In preferred embodiments, the term ‘glass’ in ‘spherical glass beads’ as used herein refers to non-crystalline, amorphous solid and transparent material made of oxides. In other embodiments, the term ‘glass’ in ‘spherical glass beads’ refers to solid and transparent material made of oxides and containing some microcrystallinity. The refractive index of the spherical glass beads is closely related to the density of the glass, although the relationship is not linear. Because of the nature of glass, the density is approximately an additive function of its composition. Densities of spherical glass beads having refractive indices between 1.5 and 2.8 typically vary between 2.5 and 4.5 g/cm$^3$.

Oxides that can be used in glass are oxides of silicon, boron, aluminium, sodium, barium, vanadium, titanium, lanthanum, strontium, zirconium, potassium, magnesium, iron, calcium, zinc, lithium, barium and lead. The spherical glass beads can for example comprise different combinations of silica ($SiO_2$), boric oxide ($B_2O_3$), phosphorous pentoxide ($P_2O_5$), vanadium pentoxide ($V_2O_5$), arsenic trioxide ($As_2O_3$), germanium oxide ($GeO_2$), calcium oxide ($CaO$), sodium oxide ($Na_2O$), magnesium oxide ($MgO$), zinc oxide ($ZnO$), aluminium oxide ($Al_2O_3$), potassium oxide ($K_2O$), iron oxide ($Fe_2O_3$), lead oxide ($PbO$), barium oxide ($BaO$), barium titanate ($BaTiO_3$), titanium oxide ($TiO_2$), lithium oxide ($Li_2O$), strontium oxide ($SrO$), lanthanum oxide ($La_2O_3$), and zirconium oxide ($ZrO_2$). Silica and boric oxide are generally the lowest in density. Glasses containing large weight percentages of these oxide therefore generally result in glass beads with low refractive indices. The refractive indices can be increased by adding oxides with higher molecular weights. Preferably, the spherical glass beads do not comprise PbO.

Glass beads having refractive indices in the range of 1.5-2.51 and their composition in terms of oxides are disclosed in WO2014/109564A1, which is incorporated herein by reference in its entirety. PbO-free transparent glass beads with refractive indices of above 2.15 are disclosed in U.S. Pat. No. 4,082,427, which is incorporated herein by reference in its entirety.

The spherical glass beads may be coloured spherical glass beads as long as they remain transparent. Both coloured spherical glass beads made from coloured transparent glass and spherical glass beads provided with a concentric transparent coloured coating are encompassed by the invention. The colour may be the natural colour caused by the composition of the oxides or may be deliberately chosen by adding ingredients having a specific colour. Coloured glass beads having high refractive indices and high transparency are disclosed in WO2014/109564A1.

Accordingly, in an embodiment, at least part of the spherical glass beads are spherical glass beads made from coloured transparent glass and/or at least part of the spherical glass beads is provided with a concentric transparent coloured coating.

The spherical glass beads have a median particle diameter D50, as measured with laser diffraction. Accordingly, the median particle diameter D50 is a volume median, based on a volume distribution. The median particle diameter D50 is the diameter where half of the population of spherical glass beads lies below. This volume median particle diameter is often referred to in the art as Dv50 or $D_{v0.5}$.

In a very preferred embodiment, the spherical glass beads have a median particle diameter D50, as measured with laser diffraction, between 5 and 150 μm.

In an embodiment, the spherical glass beads have a median particle diameter D50, as measured with laser diffraction, between 25 and 100 μm, preferably between 30 and 75 μm, more preferably between 35 and 50 μm.

In a preferred embodiment, the spherical glass beads have a median particle diameter D50, as measured with laser diffraction, between 5 and 100 μm, such as between 5 and 75 μm, between 5 and 50 μm, between 5 and 45 μm, between 5 and 40 μm or between 5 and 35 μm.

In a very preferred embodiment, the spherical glass beads have a median particle diameter D50, as measured with laser diffraction, between 1 and 100 μm, such as between 1 and 75 μm, between 1 and 50 μm, between 1 and 45 μm, between 1 and 40 μm, between 1 and 35 μm, between 1 and 30 μm, between 1 and 25 μm, between 1 and 20 μm, between 1 and 15 μm or between 1 and 10 μm.

In yet another embodiment, the spherical glass beads have a median particle diameter D50, as measured with laser diffraction, between 25 and 150 μm, such as between 50 and 150 μm, between 75 and 150 μm, between 100 and 150 μm, between 110 and 150 μm or between 115 and 150 μm.

The diameters D10 and D90 are often referred to in the art as Dv10 or $D_{v0.1}$ and Dv90 or D10.9, respectively. The D10 diameter is the diameter where 10% of the population of spherical glass beads lies below. Similarly, the D90 diameter is the diameter where 90% of the population of spherical glass beads lies below.

The span, as measured by laser diffraction, of the particle size distribution of the spherical glass beads is defined by:

$$\text{span} = \frac{D90 - D10}{D50}$$

In another embodiment, the spherical glass beads have a median particle diameter D50, as measured with laser diffraction, between 15 and 100 μm and a span between 0 and 1.9, such as between 0 and 1.5, between 0 and 1, between 0 and 0.5, between 0 and 0.2 or between 0 and 0.1.

In still another embodiment, the spherical glass beads have a median particle diameter D50, as measured with laser diffraction, between 30 and 75 μm and a span between 0 and 1.9, such as between 0 and 1.5, between 0 and 1, between 0 and 0.5, between 0 and 0.2 or between 0 and 0.1.

In another preferred embodiment, the spherical glass beads have a median particle diameter D50, as measured with laser diffraction, between 15 and 50 μm and a span between 0 and 1.9, such as between 0 and 1.5, between 0 and 1, between 0 and 0.5, between 0 and 0.2 or between 0 and 0.1.

In yet another preferred embodiment, the spherical glass beads have a median particle diameter D50, as measured with laser diffraction, between 1 and 35 μm and a span between 0 and 1.9, such as between 0 and 1.5, between 0 and 1, between 0 and 0.5, between 0 and 0.2 or between 0 and 0.1.

In yet another preferred embodiment, the spherical glass beads have a median particle diameter D50, as measured with laser diffraction, between 5 and 35 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 10 and 25 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 25 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 15 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 10 μm and a span between 0 and 1.9, such as between 0 and 1.5, between 0 and 1, between 0 and 0.5, between 0 and 0.2 or between 0 and 0.1.

As will be appreciated by those skilled in the art, span=0 corresponds to monodisperse spherical glass beads.

In a preferred embodiment, at least part of the spherical glass beads are hemispherically coated with a light-reflective coating, preferably with a hemispherical aluminium coating (HAC). In another embodiment, at least part of the spherical glass beads is fluoro-chemically coated.

In a very preferred embodiment, the amount of the spherical glass beads is 20-70 wt. %, based on the total weight of the organic solvent-based retroreflective ink, coating or paint composition.

In a preferred embodiment, the amount of the spherical glass beads is 23-68 wt. %, more preferably 25-65 wt. %, even more preferably 28-63 wt. %, based on the total weight of the organic solvent-based retroreflective ink, coating or paint composition.

In embodiments, the amount of the spherical glass beads is 20-65 wt. %, 20-63 wt. %, 20-60 wt. %, 20-57 wt. %, 20-54 wt. %, 20-52 wt. % or 20-50 wt. %, based on the total weight of the organic solvent-based retroreflective ink, coating or paint composition.

In embodiments, the amount of the spherical glass beads is 1-80 wt. %, 1-78 wt. %, 1-76 wt. %, 1-74 wt. %, 1-72 wt. %, 1-70 wt. % or 1-68 wt. %, based on the total weight of the organic solvent-based retroreflective ink, coating or paint composition.

In other embodiments, the amount of the spherical glass beads is 22-70 wt. %, 24-70 wt. %, 26-70 wt. %, 27-70 wt. %, 28-70 wt. %, 29-70 wt. % or 30-70 wt. %, based on the total weight of the organic solvent-based retroreflective ink, coating or paint composition.

In still other embodiments, the amount of the spherical glass beads is 2-85 wt. %, 5-85 wt. %, 8-85 wt. %, 10-85 wt. %, 12-85 wt. %, 14-85 wt. % or 16-85 wt. %, based on the total weight of the organic solvent-based retroreflective ink, coating or paint composition.

The particular application of the organic solvent-based retroreflective ink, coating or paint composition determines the optimum refractive index of the spherical glass beads. If the composition is to be applied in a dry environment or onto a substrate that is to show retroreflectivity under dry conditions and wherein the applied layer of retroreflective spherical glass beads is not coated by a further layer, the refractive index of the spherical glass beads, measured at a wavelength $\lambda$ of 589 nm, can be between 1.8 and 2.8.

In an embodiment, the organic solvent-based retroreflective ink, coating or paint composition as defined herein comprises spherical glass beads having a refractive index, measured at a wavelength $\lambda$ of 589 nm, between 1.8 and 2.0.

If, on the other hand, the composition is to be applied in a wet environment or onto a substrate that is to show retroreflectivity under wet conditions or the applied layer of retroreflective spherical glass beads is coated by one or more further transparent layers, the refractive index of the spherical glass beads, measured at a wavelength $\lambda$ of 589 nm, preferably is between 2.0 and 2.8, more preferably between 2.2 and 2.4. Compositions that are to show retroreflectivity under both dry and wet conditions and wherein the applied layer of retroreflective spherical glass beads is coated or is not coated by one or more further transparent layers can comprise different types of glass beads having different refractive indices, and optionally different sizes. In an embodiment, the organic solvent-based retroreflective ink, coating or paint composition as defined herein comprises spherical glass beads having a refractive index, measured at a wavelength λ of 589 nm, between 2.0 and 2.8, preferably between 2.2 and 2.4.

In another embodiment, the organic solvent-based retroreflective ink, coating or paint composition as defined herein comprises at least two types of spherical glass beads wherein at least one type of spherical glass beads has a refractive index, measured at a wavelength λ of 589 nm, between 1.8 and lower than 2.0 and at least one further type of spherical glass beads has a refractive index, measured at a wavelength λ of 589 nm, between 2.0 and 2.8.

Thickener

The organic solvent-based retroreflective ink, coating or paint composition comprises thickener. Without wishing to be bound by any theory, it is believed that the thickener limits or reduces settling and/or sedimentation of the spherical glass beads and optionally of further particulate matter in the organic solvent-based retroreflective ink, coating or paint composition so that the composition can be easily resuspended. Moreover, again without wishing to be bound by any theory, it is believed that the thickener provides the organic solvent-based retroreflective ink, coating or paint composition with shear-thinning behaviour.

In preferred embodiments, the thickener encompasses a mixture of different thickeners.

Preferred examples of thickeners that can be used in the organic solvent-based retroreflective ink, coating or paint composition are chosen from the group consisting of (modified) hydrogenated castor oil, clay, modified clay, calcium sulphonate complex, organophilic phyllosilicate, silica-gel, synthetic amorphous silica, acrylic acid type gellants, modified cellulosic materials, polyurea dispersions, solutions of urea-modified polyamides, polyurethane dispersions and combinations thereof.

Examples of modified clay includes BENTONER LT and BENTONER 38 (Elementis Global). Examples of a silica-gel include HDKR N20 (Wacker Chemical Corporation) and AEROSILR (Evonik). An example of organophilic phyllosilicate is Claytone 40 (Byk). An example of a modified hydrogenated castor oil is EfkaR RM 1900 (BASF). An example of a hydrogenated castor oil is EfkaR RM 1920 (BASF). An example of a solution of a urea-modified non-polar polyamide in isobutanol/monophenyl glycol is Rheobyk-431 (Byk). An example of a solution of a urea-modified polyamide of medium polarity in isobutanol/solvent naphtha is Rheobyk-430 (Byk). An example of synthetic amorphous silica is Zeothix® (Huber).

In a preferred embodiment, two thickeners are used in the organic solvent-based retroreflective ink, coating or paint composition, more preferably:

- an organophilic phyllosilicate and a modified hydrogenated castor oil; or
- a calcium sulphonate complex and a polyurea dispersion.

In a preferred embodiment, the amount of thickener is 0.20-1.18 wt. %, more preferably 0.25-1.15 wt. %, even more preferably 0.30-1.10 wt. %, based on the total weight of the organic solvent-based retroreflective ink, coating or paint composition.

In embodiments, the amount of thickener is 0.15-1.18 wt. %, 0.15-1.15 wt. % or 0.15-1.10, based on the total weight of the organic solvent-based retroreflective ink, coating or paint composition.

In other embodiments, the amount of thickener is 0.20-1.20 wt. %, 0.30-1.20 wt. %, 0.40-1.20 wt. %, 0.45-1.20 wt. % or 0.50-1.20 wt. %, based on the total weight of the organic solvent-based retroreflective ink, coating or paint composition.

The amount of organic solvent in the organic solvent-based retroreflective ink, coating or paint composition is independently specified. If a thickener is applied in the form of for example a dispersion in solvent, the amount of thickener as defined hereinbefore concerns the dry weight of the thickener.

Further Ingredients

As described hereinbefore, the organic solvent-based retroreflective ink, paint or coating composition comprises 0-30 wt. % of one or more further ingredients. As will be appreciated by the skilled person, the 'further' ingredients are different from the other ingredients defined in the organic solvent-based retroreflective ink, paint or coating composition. In other words, the further ingredients do not comprise spherical glass beads, thickeners and organic solvents.

In a preferred embodiment, the one or more further ingredients are chosen from the group consisting of foam control agents, luminescent agents, UV-absorbers, binders and resins, preservatives, dyes, pigments and curing initiators.

Suitable binders and resins for compositions based on organic solvents are generally known to the skilled person. The binder or resin can be radiation-curable. If the binder or resin is radiation curable, the further ingredients can comprise a curing initiator, such as a photoinitiator or a thermal initiator.

In an embodiment, the organic solvent-based retroreflective ink, paint or coating composition comprises, as part of the one or more further ingredients, synthetic pigment flakes having an average diameter of between 5 and 50 μm, a thickness smaller than 1 μm, and an aspect ratio (flake diameter/thickness) of at least 10, wherein said synthetic pigment flakes are chosen from (A), (B), (C) or a combination thereof:

(A) Metal flakes or synthetic mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colourants and a binder;

(B) Flakes comprising $Al_2O_3$, $SiO_2$, glass, ceramics, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

(C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder.

The term 'average diameter' in the context of the synthetic pigment flakes refers to the median particle diameter D50.

As will be appreciated by those skilled the art, the term 'synthetic' in 'synthetic pigment flakes' means that the pigment flakes are not pigment flakes naturally occurring, but they are pigment flakes that have been chemically manufactured or naturally occurring pigment flakes that have been chemically/physically processed. One of the advantages of using synthetic pigment flakes is that they can be produced with very smooth surfaces, thereby increasing their reflective properties.

The terms 'flake' or 'platelet' as used herein refers to the shape of pigments having a large surface area and a small thickness. Typically, flakes or platelets are characterized by their 'aspect ratio', being defined as the largest dimension, i.e. the largest diameter of the surface, divided by the smallest dimension, i.e. the thickness. The synthetic pigment flakes as used herein have and aspect ratio of at least 10, preferably at least 15, more preferably at least 20.

In a preferred embodiment, the average diameter of the synthetic flakes is 6-45 μm, more preferably 7-35 μm, even more preferably 8-25 μm, still more preferably 9-20 μm, most preferably 10-16 μm.

In a preferred embodiment, the thickness of the synthetic flakes is between 10 nm and 800 nm, more preferably between 15 nm and 600 nm. In another preferred embodiment, the thickness of the synthetic flakes is between 10 and 200 nm, more preferably between 10 and 150 nm, even more preferably between 10 and 100 nm, still more preferably between 10 and 50 nm.

In embodiments, the amount of the one or more further ingredients is 0-25 wt. %, 0-20 wt. %, 0-15 wt. %, 0-12 wt. %, 0-10 wt. %, 0-8 wt. %, 0-6 wt. % or 0-5 wt. %, based on the total weight of the organic solvent-based retroreflective ink, paint or coating composition.

In other embodiments, the amount of the one or more further ingredients is 0.1-23 wt. %, 0.5-17 wt. %, or 1-15 wt. %, based on the total weight of the organic solvent-based retroreflective ink, paint or coating composition.

The amount of organic solvent in the organic solvent-based retroreflective ink, paint or coating composition is independently specified. If one or more further ingredients is/are applied in the form of for example a solution, suspension or dispersion in a solvent, the amount of the one or more further ingredients defined hereinbefore concerns the dry weight, i.e. the weight without the solvent, of the of the one or more further ingredients.

Rheological Behaviour

The organic solvent-based retroreflective ink, paint or coating composition has shear-thinning behaviour. This means that the composition has a viscosity that decreases when the static/stable situation is perturbed by subjecting it to a certain increased shear rate.

As defined hereinbefore, the organic solvent-based retroreflective ink, paint or coating composition as defined herein has a first Brookfield viscosity $\eta_1$ at a shear rate of 0.5 rpm of between 0.2 and 8 Pa·s and a second Brookfield viscosity $\eta_2$ at a shear rate of 20 rpm that is between 80 and 450 mPa·s, with the proviso that $\eta_2$ is at least 2 times lower than $\eta_1$, as measured with a #2 spindle in a 600 ml beaker having a diameter of 8.25 cm at a temperature of 25° C.

In a preferred embodiment, $\eta_1$ is between 0.25 and 5 Pa·s and $\eta_2$ is between 100 and 425 mPa·s, with the proviso that $\eta_2$ is at least 2 times lower than $\eta_1$. In another preferred embodiment, $\eta_1$ is between 0.26 and 2.5 Pa·s and $\eta_2$ is between 110 and 400 mPa·s, with the proviso that $\eta_2$ is at least 2 times lower than $\eta_1$. In still another preferred embodiment, $\eta_1$ is between 0.27 and 2 Pa·s and $\eta_2$ is between 120 and 350 mPa·s, with the proviso that $\eta_2$ is at least 2 times lower than $\eta_1$.

The first viscosity $\eta_1$ of the organic solvent-based retroreflective ink, paint or coating composition determined at a shear rate of 0.5 rpm is sufficient to keep the spherical glass beads and optional further particulate materials in suspension for a sufficiently long period. The shear rate of 20 rpm is typical for (industrial) spraying conditions under which the organic solvent-based retroreflective ink, paint or coating composition can be applied to a substrate. The second viscosity $\eta_2$ is sufficiently low to provide organic solvent-based retroreflective ink, paint or coating compositions that can easily be sprayed.

In a preferred embodiment, the organic solvent-based retroreflective ink, paint or coating composition as defined herein has a third Brookfield viscosity $\eta_3$ at a shear rate of 10 rpm of lower than 1.5 Pas, more preferably lower than 1.3 Pas, even more preferably lower than 1.1 Pa·s, such as lower than 1.0 Pa·s, lower than 0.8 Pa·s, or lower than 0.6 Pa·s, as measured with a #5 spindle in a 600 ml beaker having a diameter of 8.25 cm at a temperature of 25° C.

In another preferred embodiment, the organic solvent-based retroreflective ink, paint or coating composition as defined herein has a fourth Brookfield viscosity $\eta_4$ at a shear rate of 0.5 rpm of between 0.25 and 5 Pa·s, and a fifth Brookfield viscosity $\eta_5$ at a shear rate of 20 rpm of between 80 and 450 mPa·s, with the proviso that $\eta_5$ is at least 2 times lower than $\eta_4$, as measured with a #3 spindle in a 600 ml beaker having a diameter of 8.25 cm at a temperature of 25° C.

In still another preferred embodiment, the organic solvent-based retroreflective ink, paint or coating composition as defined herein has a fourth Brookfield viscosity $\eta_4$ at a shear rate of 0.5 rpm of between 0.30 and 3 Pas, and a fifth Brookfield viscosity $\eta_5$ at a shear rate of 20 rpm of between 100 and 425 mPa·s, with the proviso that $\eta_5$ is at least 2 times lower than $\eta_4$, as measured with a #3 spindle in a 600 ml beaker having a diameter of 8.25 cm at a temperature of 25° C.

In yet another preferred embodiment, the organic solvent-based retroreflective ink, paint or coating composition as defined herein has a fourth Brookfield viscosity $\eta_4$ at a shear rate of 0.5 rpm of between 0.35 and 2.5 Pa·s, and a fifth Brookfield viscosity $\eta_5$ at a shear rate of 20 rpm of between 110 and 400 mPa·s, with the proviso that $\eta_5$ is at least 2 times lower than $\eta_4$, as measured with a #3 spindle in a 600 ml beaker having a diameter of 8.25 cm at a temperature of 25° C.

Process for the Preparation of the Organic Solvent-Based Retroreflective Ink, Paint or Coating Composition Generally speaking, the ingredients of the organic solvent-based retroreflective ink, coating or paint composition can be added in any order. It is however preferred to add the thickener at the end of the process, at least after adding the spherical glass beads to the organic solvent, since homogeneously distributing the ingredients is more difficult in a thickened composition.

In a preferred embodiment, the thickener is added after mixing organic solvent and spherical glass beads. In another preferred embodiment, the thickener is added after mixing organic solvent, spherical glass beads and any further ingredients. Stirring or homogenization is preferably performed at low shear rates to avoid the inclusion of air bubbles in the organic solvent-based retroreflective ink, coating or paint composition.

In a second aspect, a process is provided for the preparation of an organic solvent-based retroreflective ink, coating or paint composition as defined herein, said process comprising the steps of:

(i) adding the organic solvent, the spherical glass beads as defined hereinbefore, the thickener as defined hereinbefore and the optional one or more further ingredients as defined hereinbefore, to a container; and (ii) stirring or homogenizing the mixture obtained in step (i), preferably at a temperature between 15 and 70° C., preferably for a period of between 5 and 60 minutes.

Adding the different ingredients can however also be performed at different stages of the process. Consequently, in an embodiment, a process is provided for the preparation of an organic solvent-based retroreflective ink, coating or paint composition as defined herein, said process comprising the steps of:

(i) adding the organic solvent, the spherical glass beads as defined hereinbefore, at least part of the thickener as defined hereinbefore and optionally part of the one or more further ingredients as defined hereinbefore, to a container;

(ii) stirring or homogenizing the mixture obtained in step (i), preferably at a temperature between 15 and 70° C., preferably for a period of between 5 and 60 minutes;

(iii) adding at least part of the one or more further ingredients as defined hereinbefore to the composition obtained in step (ii) or (iii), optionally adding part of the thickener as defined hereinbefore and optionally adding organic solvent; and (iv) stirring or homogenizing the mixture obtained in step (iii), preferably at a temperature between 15 and 70° C., preferably for a period of between 5 and 60 minutes.

In embodiments, the time between performing steps (i) and (ii) on the one hand and steps (iii) and (iv) on the other hand may be days or months or even longer.

The process for the preparation of the organic solvent-based retroreflective ink, coating or paint composition may also encompass the production of an intermediate organic solvent-based retroreflective ink, coating or paint composition having the composition and properties as defined hereinbefore, followed by adding and admixing another composition to obtain a final organic solvent-based retroreflective ink, coating or paint composition, with the proviso that the final organic solvent-based retroreflective ink, coating or paint composition still has a composition and the properties as defined hereinbefore.

Consequently, in an embodiment, a process is provided for the preparation of an organic solvent-based retroreflective ink, coating or paint composition as defined herein, said process comprising the steps of:

(i) adding the organic solvent, the spherical glass beads as defined hereinbefore, at least part of the thickener as defined hereinbefore and optionally part of the one or more further ingredients as defined hereinbefore, to a container;

(ii) stirring or homogenizing the mixture obtained in step (i), preferably at a temperature between 15 and 70° C., preferably for a period of between 5 and 60 minutes to obtain an intermediate organic solvent-based retroreflective ink, coating or paint composition having the composition and properties of the organic solvent-based retroreflective ink, coating or paint composition as defined hereinbefore;

(iii) adding at least part of the one or more further ingredients as defined hereinbefore to the intermediate organic solvent-based retroreflective ink, coating or paint composition obtained in step (ii), optionally adding part of the thickener as defined hereinbefore and optionally adding organic solvent; and (iv) stirring or homogenizing the mixture obtained in step (iii), preferably at a temperature between 15 and 70° C., preferably for a period of between 5 and 60 minutes to obtain the organic solvent-based retroreflective ink, coating or paint composition.

In embodiments, the time between performing steps (i) and (ii) on the one hand and steps (iii) and (iv) on the other hand may be days or months or even longer.

Process for Coating a Substrate

In a third aspect, the invention concerns a process for coating a substrate with a retroreflective layer, said process comprising the steps of:

a) providing a substrate;

b) optionally applying a primer layer to the substrate of step (a);

c) optionally, but not preferably, applying a coloured base layer to the substrate of step (a) or to the primer layer of step (b);

d) spraying the organic solvent-based retroreflective ink, coating or paint composition as defined hereinbefore onto the substrate of step (a) or onto the layer of step (b) or (c);

e) drying and/or curing the substrate coated with the retroreflective layer obtained in step (d); and f) optionally coating the dried substrate coated with the retroreflective layer obtained in step (e) with one or more further transparent coating layers followed by drying and/or curing.

Step (d) of spraying the organic solvent-based retroreflective ink, coating or paint composition can comprise spraying a single layer in one step or multiple layers on top of each other in subsequent spraying steps. The subsequent layers are preferably applied 'wet on wet', meaning that a subsequent layer is applied onto the previous layer from which at least some to practically all organic solvent is evaporated but which is not (fully) cured. This means that, even when subsequent layers are applied 'wet on wet', an intermediate drying step is applied between applying the subsequent layers.

Intermediate drying of layers is typically performed at a temperature of between 20 and 30° C. for about 2 to 15 minutes.

It is also possible to completely dry and/or cure a previous layer before applying a subsequent layer. Complete drying and/or curing of a layer is typically performed at a temperature of about 60° C. for about 20 minutes or 30 minutes in open air at a temperature of about 20° C. It is within the skills of the artisan to choose the appropriate drying conditions.

In an embodiment, step (d) encompasses spraying more than one layer, such as 2, 3, 4 or 5 layers.

In an embodiment, step (d) encompasses n subsequent spraying steps resulting in n layers, and wherein layer x is at least partially applied onto layer x-1, wherein x is an integer between 2 and n, and wherein n is an integer between 2 and 5.

In preferred embodiments, the organic solvent-based retroreflective ink, coating or paint composition is applied in step (d) in an amount of 100-800 g per $m^2$ of the substrate, more preferably in an amount of 100-400 g per $m^2$ of the substrate.

In an embodiment step (b) is not performed. In a very preferred embodiment step (c) is not performed.

The geometry of the substrate to be coated is not limited in any sense as long as it can be coated by spraying, i.e. as long as droplets of the organic solvent-based retroreflective ink, coating or paint composition can reach the surface of the substrate. In embodiments, the substrate is planar. In other embodiments the substrate is curved. In further embodiments, the substrate comprises planar parts and curved parts.

The inventors have established that the organic solvent-based retroreflective ink, coating or paint compositions can be applied, e.g. using professional or industrial (high-speed) spraying, to various substrates resulting in retroreflective coating layers with excellent print or coating quality, such as homogeneity and retroreflectivity at wide angles. These results can also be obtained when the organic solvent-based retroreflective ink, coating or paint composition is applied to the surface of a substrate that is positioned vertically and even if the surface of a substrate is sprayed from below.

If the retroreflective coating layer is provided with one or more further transparent coating layers (i.e. step (f) of the process for coating a substrate as defined hereinbefore is performed), a retroreflective layer with high smoothness and improved cleanability is obtained.

In preferred embodiments, the substrate is chosen from textiles, leather, metal, concrete, rubber, plastics, carbon fibers, and combinations thereof. Textiles as used herein encompass woven or knitted textile fabrics such as cotton, polyesters, nylon, silk, wool, viscose and acrylics.

Irrespective of the type of material the substrate is made of, the substrate can be chosen from the group consisting of clothes, traffic signs, car chassis or coachworks, bicycle frames, roads, pavements and guard rails.

A substrate provided with a retroreflective coating in accordance with the present invention may be provided in step (f) with one or more further transparent coating layers. These one or more further transparent coating layers can serve to protect the retroreflective layer against scuffing and/or against moisture. Moreover, they can be used to provide the substrate coated with the retroreflective layer with a specific matte or shiny/glossy appearance. The one or more further transparent coating layers can be coloured. The one or more further transparent coating layers applied in optional step (f) may comprise liquid coating layers, powder coating layers or combinations thereof, that are subsequently cured or dried.

If one or more further transparent coating layers are to be applied in step (f) on a layer of the organic solvent-based retroreflective ink, coating or paint composition, this layer of the organic solvent-based retroreflective ink, coating or paint composition is typically not fully cured. It is within the skills of the artisan to choose the appropriate drying conditions.

The spraying in step (c) is preferably performed using curtain coating, a spray gun, a high-speed rotary bell, a high-speed rotating disc or using a spray can with a propellant. In a preferred embodiment spraying is performed without using a propellant.

In a fourth aspect, the invention concerns substrates coated with a retroreflective layer obtained by or obtainable by the process as defined hereinbefore. The substrate coated with the retroreflective layer can have a matte or shiny appearance.

In a preferred embodiment, the substrate coated with the retroreflective layer, preferably coated with one or more further transparent coating layers (i.e. step (e) of the process for coating a substrate as defined hereinbefore is performed), shows retroreflection of the retroreflective layer at any angle between 0 and 80°, such as between 0 and 78°, between 0 and 75, between 0 and 70°, between 0 and 65°, between 0 and 60, between 0 and 55°, between 0 and 50°, between 0 and 45° and between 0 and 40°, from the perpendicular of the coated substrate. This retroreflection of the retroreflective layer is determined by directing the beam of a torch to the retroreflective layer, wherein the sightline of the eyes substantially coincides with the beam of the torch, and by visually determining whether retroreflection is observed. The experiment starts at zero angle with the perpendicular of the coated substrate after which the angle is gradually increased until no retroreflection is discerned anymore.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Measuring Protocol Viscosity

Viscosities were measured using a Brookfield Ametek® DV2T viscometer at a temperature of 25° C. using different standardized spindles (#2, #3 and #5; LV-2, LV-3 and LV-5 obtained from Brookfield Ametek®) according to operating instructions. Measurements were performed in a 600 ml low form Griffin beaker with a flat bottom having a diameter of 8.25 cm, without using a guard leg. Before measuring the viscosity, the samples were brought to the temperature of 25° C. and were homogenized using stirring.

Example 1

Four compositions (samples 2, 4, 5 and 7) according to the invention and four comparative compositions (samples 1, 3, 6 and 8) were prepared on kg scale. The following ingredients were used.

Spherical Glass Beads:

- Micro glass beads (RI 2.2), obtained from Jianxi Sunflex Light Retroreflective Material Co, Ltd., having a refractive index of about 2.2, measured at a wavelength 2 of 589 nm, having a median particle diameter D50 of 26.56 μm, a D10 diameter of 19.77 μm and a D90 diameter of 32.41 μm, as measured with laser diffraction, and a specific gravity of about 4.5 g/cm$^3$. These spherical glass beads comprise $TiO_2$, BaO, CaO, $SiO_2$ and ZnO.
- Micro glass beads (RI 1.9, HAC), obtained from Jianxi Sunflex Light Retroreflective Material Co, Ltd., hemi-spherically aluminium coated glass beads having a refractive index of about 1.9, measured at a wavelength 2 of 589 nm, having a median particle diameter D50 of 38.22 μm, a D10 diameter of 34.86 μm and a D90 diameter of 43.04 μm, as measured with laser diffraction, and a specific gravity of about 4.2 g/cm$^3$. These spherical glass beads comprise $TiO_2$, BaO, $SiO_2$, CaO and $Al_2O_3$.

Organic Solvents

- · Solvent part of Cromax XB165 Centari 6000 Low Emission Binder (Axalta), mixture of organic solvents, comprising xylene, toluene, ethylbenzene, isopentyl acetate, n-butyl acetate, isobutanol and 2-methoxy-1-methylethylacetate
- Cromax XB383 (Axalta), comprising mixture of organic solvents, such as xylene, ethylbenzene, naphtha, 1,2,4- trimethylbenzeen, mesitylene, n-propylbenzene, isopentyl acetate, n-butyl acetate, 2-methylbutyl acetate and 4-methyl-2-pentanone Cromax AU370/Imron® 700 Polyurethane Thinner (Axalta), comprising xylene, ethyl acetate, n-butyl acetate, ethylbenzene, isopentylacetate, 2-methylbutylacetate and toluene Avatar T-4500 (obtained from Global Refinish Trading Center, Cyprus), Acrylate thinner, comprising dimethylbenzene (mixture of isomers), n-butyl acetate, 1-methoxy-2-propyl acetate, ethylbenzene and 2-(2-butoxyethoxy)ethanol Solvent part of Aquamet® CP-BG/8500/60 obtained from Schlenk Metallic Pigments GmbH, butyl glycol Further Ingredients Binder part of Cromax XB165 Centari 6000 Low Emission Binder Solids fraction of Aquamet® CP-BG/8500/60 obtained from Schlenk Metallic Pigments GmbH, silica-coated aluminium flakes, having an average diameter of about 16 μm and a thickness of <1 μm Xirallic® T61-10 WNT Micro Silver, obtained from Merck KGaA, coated aluminium oxide flakes, having an average diameter of between 8 and 14 μm and a thickness of <1 μm Thickeners Efka® RM 1900, obtained from BASF, modified hydrogenated castor oil, fine powder, thickener Efka® RM 1920, obtained from BASF, hydrogenated castor oil, fine powder, thickener Claytone 40, obtained from Byk, organophilic phyllosilicate, thickener Four compositions according to the invention (samples 2, 4, 5 and 7) and four comparative compositions (samples 1, 3, 6 and 8) were prepared by adding ingredients in the following order to a container (3.5 liter):

(1) add organic solvent, e.g. Avatar T-4500, at ambient temperature (~20° C.) and start stirring at 500 rpm;

(2) add glass beads at ambient temperature (~20)° C. while mixing at 500 rpm for at least 5 minutes;

(3) add first thickener at ambient temperature (~20° C.), e.g. Claytone 40, while mixing at 1300 rpm for at least 5 minutes and increase rpm slowly to 2000 rpm without introducing air bubbles;

(4) add further thickener, e.g. Efka® RM 1900 and/or Efka® RM 1920, and continue stirring for at least 45 minutes at 1800 rpm and further increase rpm slowly if necessary without introducing air bubbles;

(5) add further ingredients, e.g. Cromax XB165 and pigment flakes, while mixing at 2000 rpm and continue mixing at 2000 rpm for at least 15 minutes; and (6) optionally add additional thickener, followed by stirring for another 15 minutes at about 1800 rpm.

The amounts of the different ingredients is listed in Table 1.

TABLE 1

| Ingredients | Sample Comp. 1 [wt. %] | 2 [wt. %] | Comp. 3 [wt. %] | 4 [wt. %] | 5 [wt. %] | Comp. 6 [wt. %] | 7 [wt. %] | Comp. 8 [wt. %] |
|---|---|---|---|---|---|---|---|---|
| Organic solvents[1] | | | | | | | | |
| Cromax XB165 | 33.39 | 33.77 | 30.11 | 29.48 | 35.38 | 35.05 | 35.35 | 35.04 |
| Cromax XB383 | 17.03 | 17.25 | 25.61 | 25.81 | | | | |
| Cromax AU370 | | | | | 17.26 | 17.06 | | |
| Avatar T-4500 | | | | | | | 18.00 | 17.84 |
| Aquamet CP-BG/8500/60 | 1.64 | 1.64 | | | | | | |
| Subtotal organic solvents[1] | 52.06 | 52.67 | 55.72 | 55.30 | 52.64 | 52.11 | 53.35 | 52.88 |
| Spherical glass beads | | | | | | | | |
| Glass Beads 2.2 | | | 31.32 | 32.13 | | | 36.43 | 36.12 |
| Glass Beads 1.9 HAC | 34.41 | 34.85 | | | 36.87 | 36.44 | | |
| Subtotal spherical glass beads | 34.41 | 34.85 | 31.32 | 32.13 | 36.87 | 36.44 | 36.43 | 36.12 |
| Further ingredients[2] | | | | | | | | |
| Aquamet CP-BG/8500/60 | 2.46 | 2.47 | | | | | | |
| Xirallic T61-10 WNT Micro Silver | | | 3.64 | 3.57 | | | | |
| Cromax XB155 | 8.97 | 9.07 | 8.09 | 7.92 | 9.50 | 9.42 | 9.50 | 9.41 |
| Subtotal further ingredients[2] | 11.43 | 11.54 | 11.73 | 11.49 | 9.50 | 9.42 | 9.50 | 9.41 |
| Thickeners | | | | | | | | |
| Claytone 40 | 1.77 | 0.83 | 0.96 | 0.99 | 0.88 | 1.73 | 0.61 | 1.28 |
| EFKA ® RM 1900 | 0.11 | 0.11 | 0.10 | 0.10 | 0.11 | 0.11 | | |
| EFKA ® RM 1920 | 0.22 | | 0.17 | | | 0.19 | 0.11 | 0.31 |
| Subtotal thickeners | 2.10 | 0.94 | 1.23 | 1.08 | 0.99 | 2.03 | 0.72 | 1.59 |
| Total composition | 100.00 | 100.00 | 100.00 | 100.00 | 100.00 | 100.00 | 100.00 | 100.00 |

[1]Solvents added as such and solvents from further ingredients and pigments

[2]The concentration of further ingredients is based on dry mass. Solvents are listed separately The viscosities of the compositions in Table 1 were measured with a Brookfield viscometer using a #5 spindle rotating at 10 rpm at a temperature of 25° C., with a Brookfield viscometer using a #3 spindle rotating at 0.5 and 20 rpm at a temperature of 25° C. and with a #2 spindle rotating at 0.5 and 20 rpm at a temperature of 25° C. using the protocol as defined hereinbefore. Results are given in Tables 2, 3 and 4. As shown in Tables 3 and 4, the organic solvent-based retroreflective ink, coating or paint compositions according to the invention and the comparative compositions exhibit shear-thinning behaviour.

TABLE 2

| Brookfield viscosity using a #5 spindle rotating at 10 rpm at about 25° C. | |
|---|---|
| Sample | Viscosity [mPa · s] |
| Comp. 1 | 1800 |
| 2 | 840 |
| Comp. 3 | 960 |
| 4 | 480 |
| 5 | 480 |
| Comp. 6 | 1560 |
| 7 | 480 |
| Comp. 8 | 6840 |

The resulting Brookfield viscosities of the compositions according to the invention as measured with a #5 spindle rotating at 10 rpm are thus between 480 and 840 mPa·s, which is far below the lower value required for screen printing (ink) as disclosed in WO00/42113A1.

TABLE 3

| Brookfield viscosity using a #3 spindle at about 25° C. | | |
|---|---|---|
| Sample | Viscosity at 0.5 rpm [Pa · s] | Viscosity at 20 rpm [mPa · s] |
| Comp. 1 | 12.24 | 860 |
| 2 | 1.44 | 378 |
| Comp. 3 | 12.00 | 660 |
| 4 | 0.48 | 126 |
| 5 | 0.48 | 234 |
| Comp. 6 | 10.80 | 930 |
| 7 | 1.20 | 348 |
| Comp. 8 | 9.60 | 612 |

The resulting Brookfield viscosities of the compositions according to the invention as measured with a #3 spindle rotating at 0.5 and 20 rpm are thus between 0.48 and 1.44 Pa·s and between 126 and 378 mPa·s, respectively, which values are far below the lower values specified in WO2004/017104A1.

TABLE 4

| Brookfield viscosity using a #2 spindle at about 25° C. | | |
|---|---|---|
| Sample | Viscosity at 0.5 rpm [Pa · s] | Viscosity at 20 rpm [mPa · s] |
| Comp. 1 | 13.44 | 768 |
| 2 | 1.38 | 245 |
| Comp. 3 | 12.54 | 633 |
| 4 | 0.30 | 138 |
| 5 | 0.84 | 213 |
| Comp. 6 | 12.30 | 915 |
| 7 | 1.44 | 266 |
| Comp. 8 | 38.52 | Not determined |

Stability of the compositions in Table 1 was determined by visual and tactile inspection of whether the sample shows sedimentation, syneresis or separation (phase or otherwise) after a certain time after resuspension. See Table 5.

TABLE 5

| Sample | Sprayability 4 hrs after last resuspension | Sedimentation 48 hrs after last resuspension | Syneresis 48 hrs after last resuspension |
|---|---|---|---|
| Comp. 1 | Sprayable | None | None |
| 2 | Sprayable | None | None |
| Comp. 3 | Sprayable | None | None |
| 4 | Sprayable | Very soft sedimentation | None |
| 5 | Sprayable | Very soft sedimentation | None |
| Comp. 6 | Sprayable | None | None |
| 7 | Sprayable after slight shaking | Yes, resuspension possible | Very little, resuspension possible |
| Comp. 8 | Sprayable | Very soft sedimentation, resuspension possible | Very little, resuspension possible |

Example 2

The compositions in Table 1 of Example 1 were applied at ambient temperature (about 20° C.) to planar greyish metal test plates (10.5×14.9 cm, with an effective surface area of 154.2 $cm^2$), having a vertical black bar (0.3 cm width) across the whole surface, using a spray gun (DeV-ILBISS HVLP, DV1-C1 Plus) with a nozzle of 1.3 mm. The spray gun was positioned 30 cm apart from the metal test plates and a pressure of 1.9 bar was applied. One layer was applied. The layer was allowed to dry and cure for 30 minutes in open air at a temperature of about 20° C. The weight of the dried and cured layer applied [$g/m^2$] was determined (see Table 6).

TABLE 6

| Sample | Weight of the dried and cured layer [$g/m^2$] |
|---|---|
| Comp. 1 | 138 |
| 2 | 151 |
| Comp. 3 | 141 |
| 4 | 105 |
| 5 | 121 |
| Comp. 6 | 146 |
| 7 | 174 |
| Comp. 8 | 166 |

After drying, the coating quality was visually inspected. The general (off centre) retroreflectiveness and the maximum angle of retroreflection [°] of both the comparative examples and the examples according to the invention were considered good.

The maximum angle of retroreflection [°] was determined by directing the beam of a torch to the retroreflective layer, wherein the sightline of the eyes substantially coincides with the beam of the torch, and by visually determining whether retroreflection is observed or not. The experiment starts at zero angle with the perpendicular of the coated substrate after which the angle is gradually increased until no retroreflection is discerned anymore.

Smoothness of the coating layers or 'orange peel' was assessed by directing light through a grid under an angle onto the surface of the coating layer and by observing the sharpness of the image of the grid reflected by the surface of the coating layer. The sharper the image of the grid reflected by the surface of the coating layer, the smoother the surface is and the less orange peel there is.

Figure 1G:
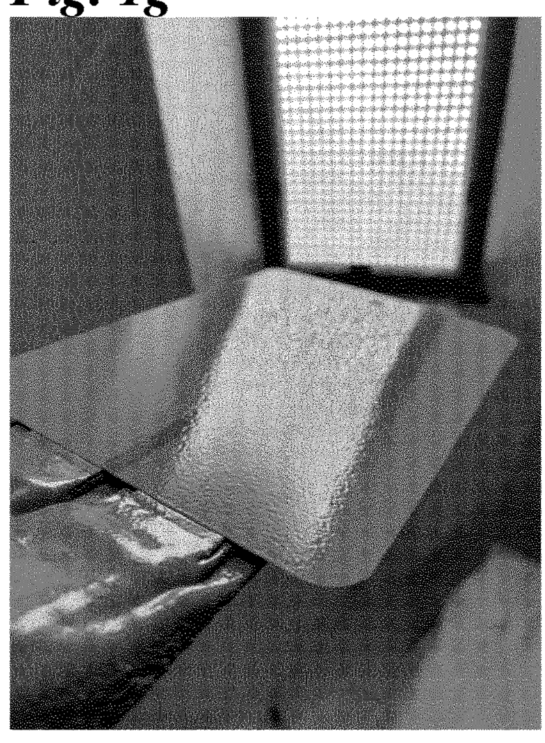
Figure 1H:
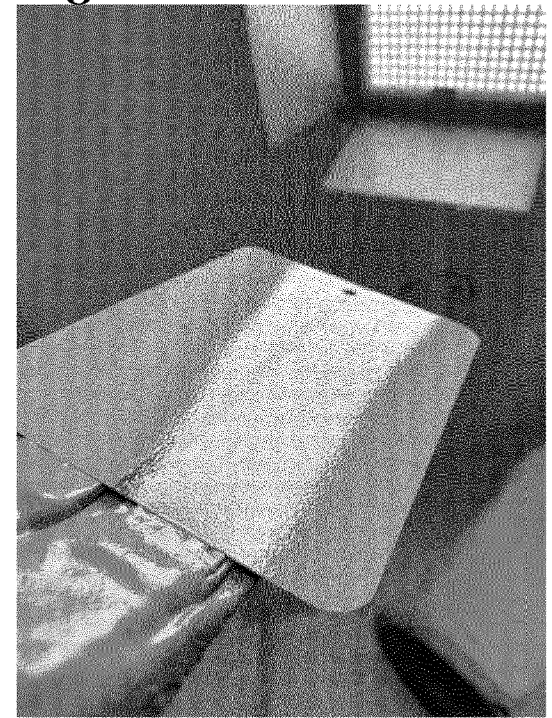

Results are presented in FIGS. 1*a* to 1*h* in the following order: Comparative Example 1, Example 2, Comparative Example 3, Examples 4 and 5, Comparative Example 6, Example 7 and Comparative Example 8. As can be clearly seen in FIGS. 1*a* to 1*h*, the examples according to the invention have much smoother surfaces, i.e. less orange peel, than the corresponding comparative examples. In this respect, the result of Comparative Example 1 (FIG. 1*a*) is to be compared with Example 2 (FIG. 1*b*), the result of Comparative Example 3 (FIG. 1*c*) is to be compared with Example 4 (FIG. 1*d*), the result of Comparative Example 6 (FIG. 1*f*) is to be compared with Example 5 (FIG. 1*e*), and the result of Comparative Example 8 (FIG. 1*h*) is to be compared with Example 7 (FIG. 1*g*). The examples according to the invention all have a much lower Brookfield viscosity using a #2 spindle at about 25° C. and 20 rpm than the corresponding comparative examples.

The invention claimed is:

1. A composition selected from an organic solvent-based retroreflective ink, an organic solvent-based paint, or an organic solvent-based coating composition, wherein:

based on the total weight of the composition, the composition consists of:

from 25 wt. % to 75 wt. % organic solvent;

from 1 wt. % to 74 wt. % spherical glass beads having a median particle diameter D50, as measured with laser diffraction, from 1 μm to 150 μm, and a refractive index, measured at a wavelength $\lambda$ of 589 nm, from 1.5 to 2.8;

from 0.15 wt. % to 1.2 wt. % thickener; and from 0 to 30 wt. % of one or more further ingredients;

the composition has a first Brookfield viscosity $\eta_1$ at a shear rate of 0.5 rpm of from 0.2 Pa·s to 8 Pa·s;

the composition has a second Brookfield viscosity $\eta_2$ at a shear rate of 20 rpm of from 80 mPa·s to 450 mPa·s;

the second Brookfield viscosity $\eta_2$ is less than or equal to 0.5 times the first Brookfield viscosity $\eta_1$; and the Brookfield viscosities $\eta_1$ and $\eta_2$ are measured with a #2 spindle in a 600 ml beaker having a diameter of 8.25 cm at a temperature of 25° C.

2. The composition of claim 1, wherein, based on the total weight of the composition, the composition consists of:

from 25 wt. % to 68 wt. % of the organic solvent;

from 20 wt. % to 70 wt. % of the spherical glass beads;

from 0.15 wt. % to 1.2 wt. % of the thickener; and from 0 to 30 wt. % of the one or more further ingredients, wherein the median particle diameter D50 of the spherical glass beads, as measured with laser diffraction, is from 5 μm to 150 μm.

3. The composition of claim 1, wherein:

the first Brookfield viscosity $\eta_1$ is from 0.25 Pa·s to 5 Pa·s; and the second Brookfield viscosity $\eta_2$ is from 100 mPa·s to 425 mPa·s.

4. The composition of claim 1, wherein:

the composition has a fourth Brookfield viscosity $\eta_4$ at a shear rate of 0.5 rpm of from 0.25 Pa·s to 5 Pa·s;

the composition has a fifth Brookfield viscosity $\eta_5$ at a shear rate of 20 rpm of from 80 mPa·s to 450 mPa·s, the fifth Brookfield viscosity $\eta_5$ is less than or equal to 0.5 times the fourth Brookfield viscosity $\eta_4$; and the Brookfield viscosities $\eta_4$ and $\eta_5$ are measured with a #3 spindle in a 600 ml beaker having a diameter of 8.25 cm at a temperature of 25° C.

5. The composition of claim 1, wherein the spherical glass beads have a refractive index, measured at a wavelength $\lambda$ of 589 nm, from 2.0 to 2.8 or from 1.7 to 2.1.

6. The composition of claim 1, wherein the spherical glass beads have a median particle diameter D50, as measured with laser diffraction, from 1 μm to 100 μm.

7. The composition of claim 1, wherein the spherical glass beads have a median particle diameter D50, as measured with laser diffraction, from 5 μm to 100 μm.

8. The composition of claim 1, wherein some or all of the spherical glass beads are hemispherically coated with an aluminium coating.

9. The composition of claim 1, wherein the organic solvent is selected from the group consisting of aliphatic and aromatic solvents, ketones, esters, glycoethers, alcohols, halogenated hydrocarbons, and combinations thereof.

10. The composition of claim 1, wherein the thickener is selected from the group consisting of hydrogenated castor oil, modified hydrogenated castor oil, clay, modified clay, calcium sulphonate complex, organophilic phyllosilicate, silica gel, synthetic amorphous silica, acrylic acid type gellants, modified cellulosic materials, polyurea dispersions, solutions of urea-modified polyamides, polyurethane dispersions, and combinations thereof.

11. The composition of claim 1, wherein the amount of thickener in the composition is from 0.20 wt. % to 1.18 wt. %, based on the total weight of the composition.

12. The composition of claim 1, wherein:

the amount of the one or more further ingredients in the composition is from greater than zero to 30 wt. %, based on the total weight of the composition; and the one or more further ingredients are selected from the group consisting of foam control agents, luminescent agents, UV-absorbers, binders and resins, preservatives, dyes and curing initiators.

13. A process for coating a substrate with a retroreflective layer, the process comprising:

(a) providing a substrate;

(b) optionally applying a primer layer to the substrate of (a);

(c) optionally applying a colored base layer to the substrate of (a) or to the primer layer of (b);

(d) spraying a composition according to claim 1 onto the substrate of (a), or onto the primer layer of (b), or onto the colored base layer of (c), to obtain a coated substrate;

(e) drying and/or curing the coated substrate obtained in (d) to obtain a dried substrate; and (f) optionally coating the dried substrate coated obtained in (e) with one or more further transparent coating layers, followed by drying and/or curing.

14. A process for preparing the composition according to claim 1, the process comprising:

(i) adding the organic solvent, the spherical glass beads, the thickener, and the optional one or more further ingredients, to a container to obtain a mixture; and (ii) stirring or homogenizing the mixture obtained in (i).

15. A substrate coated with a retroreflective layer obtained by the process according to claim 13.

16. The process according to claim 15, wherein the composition is sprayed onto the substrate in (d) using curtain coating, using a spray gun, a high-speed rotary bell, a high-speed rotating disc, or using a spray can with a propellant.

17. The process according to claim 15, wherein (d) further comprises n subsequent spraying steps, resulting in n layers, wherein each layer x is applied onto at least a part of each layer x−1, where x is an integer from 2 to n, and where n is an integer from 2 to 5.

* * * * *